United States Patent [19]
Elson

[11] 3,834,423
[45] Sept. 10, 1974

[54] CONTRACTILE-EXTENSIBLE CONDUIT AND METHOD OF MAKING SAME

[75] Inventor: Arthur M. Elson, Trenton, N.J.

[73] Assignee: Acme-Hamilton Manufacturing Corporation, Trenton, N.J.

[22] Filed: May 30, 1972

[21] Appl. No.: 257,919

[52] U.S. Cl.............................. 138/122, 138/134
[51] Int. Cl............................................. F16l 11/08
[58] Field of Search........... 138/121, 122, 131, 132, 138/133, 134, 172; 156/143, 144

[56] References Cited
UNITED STATES PATENTS

| | | | |
|---|---|---|---|
| 2,822,857 | 2/1958 | Rothermel et al. | 138/122 X |
| 2,859,775 | 11/1958 | Duff | 138/122 |
| 2,927,625 | 3/1960 | Rothermel et al. | 138/122 X |
| 2,941,571 | 6/1960 | Rothermel | 138/122 X |

*Primary Examiner*—Herbert Goldstein
*Attorney, Agent, or Firm*—Philip G. Hilbert

[57] ABSTRACT

A flexible conduit having a helical wire reinforcement embedded in the wall thereof; the reinforcement being of a character to normally place the conduit in its axially contractile condition, yet permitting axial extension as required and restoration to its contractile condition; together with a method of making such a conduit. The convolutions of the helical wire reinforcement being under torsional stress whereby the conduit in its contractile state has pleat forming wall portions between successive helical convolutions of the reinforcement; such pleat forming wall portions tending to extend radially inward despite repeated alternate extension and contraction of the conduit.

The conduit is formed by disposing inner and outer wall portions of elastomeric material on a mandrel with an interposed helical wire winding therebetween; the winding being applied over the inner wall portion in an axially stretched condition while the winding is subjected to torsional forces.

5 Claims, 6 Drawing Figures

PATENTED SEP 10 1974  3,834,423

CONTRACTILE-EXTENSIBLE CONDUIT AND METHOD OF MAKING SAME

BACKGROUND OF THE INVENTION

In some instances, flexible conduit is used which must be axially extensible to suit conditions of use and thereafter must be passed to its normally contractile state. In known conduit constructions of this type, the conduit is normally in its extended condition and must be compressed axially to place it in its contractile condition. With industrial type conduit, particularly those of larger diameters, means is provided such as springs or the like to contract the conduit from its extended condition.

It has been found that in contractile-extensible conduit, particularly those of larger diameters; the radially extending pleat portions of the conduit have a tendency to move radially outward, rather than radially inward, as the conduit passes between its extended and contractile conditions. The outwardly extending pleat portions of the conduit carcass are then subject to excessive wear, abrasion and the like; thereby markedly reducing the normal life expectancy of the conduit.

Thus, in cases where the conduit has a relatively high or medial rates of alternate expansion and contraction; the wear factor may be quite substantial, requiring replacement of the conduit at the end of relatively short time intervals.

Accordingly, an object of this invention is to provide an improved flexible conduit of the contractile-extensible type; wherein the same is provided with a helical wire reinforcement of a character to insure that carcass portions of the conduit between successive convolutions of the helical wire pleat radially inward as the conduit passes from its extended to its contracted condition, thereby protecting the same from excessive wear and abrasion.

Another object of this invention is to provide an improved conduit of the character described, which is normally in its contractile condition, yet provides a high degree of extensibility upon axially extending the same and being selfcontractile upon release of the extending forces.

Yet another object of this invention is to provide an improved conduit of the character described, which lends itself to interconnection at the opposite ends thereof to devices or apparatus which have alternating movement toward and away from each other; or where one of the devices is immovable and the other device alternately moves toward and away from the immovable device.

Still another object of this invention is to provide an improved conduit of the character described, wherein a reinforcement in the form of a helical coil of highly tempered high carbon steel wire is embedded in the carcass wall of the conduit while in an axially stretched condition; the convolutions of the stretched coil being manipulated in a manner to place the convolutions thereof under torsional stress; the stresses being transferred to carcass wall portions, whereby resultant pleated wall portions tend to remain axially inward when the conduit passes from its extended to its contracted state.

Yet a further object of this invention is to provide an improved method of making conduit wherein a coil of helical contacting turns of highly tempered high carbon steel wire is disposed between inner and outer carcass wall portions of elastomeric material; the coil being axially stretched to provide a selected pitch of the turns thereof and further, said turns being twisted to subject the same to torsional stress and retaining such twisted condition by embeddment between the inner and outer carcass wall portions.

Other objects of this invention will in part be obvious and in part hereinafter pointed out.

DESCRIPTION OF THE PREFERRED EMBODIMENTS

In accordance with the instant invention, a flexible conduit of the contractile-extensible type is formed from elastomeric material such as natural or synthetic rubber or synthetic resin; the elastomeric material having nylon or other suitable fabrics embedded therein. Such material may be in the form of fabric tapes suitably coated on opposite sides thereof with the selected elastomeric materials. The tapes are helically wound on a mandrel to a desired gauge; the ends of the winding being reinforced with additional plies of coated fabric in a manner known in the art. Thus there is provided an inner carcass portion.

Reinforcing means is applied over the inner carcass portion; such reinforcing means comprising a helical coil of highly tempered high carbon steel wire, the convolutions of the coil being in normally contacting relation to each other. The coil can be axially extended but has a strong tendency to resume its normal contracted state upon release of the extending forces.

The coil of wire, which has a diameter greater then the diameter of the inner carcass portion, is mounted over such carcass portion and is then stretched axially to provide the turns with a desired spacing or pitch. With one end of the coil anchored to the mandrel at the reinforced portion of the inner carcass portion, the other end of the coil is twisted in a direction to place a torsional stress on the convolutions of the coil. Further, such twisting action serves to reduce the diameter of the coil so as to bring the individual convolutions into contact with the outer surface of the inner carcass portion. The other end of the twisted coil is anchored to the reinforced portion at the other end of the inner carcass portion.

Additional tapes of fabric coated with selected rubber or synthetic rubber, are helically wound with overlapping edges, over the reinforcement. The thus formed assembly of mandrel, carcass and reinforcement is then placed in an autoclave to cure the carcass and to tightly embed the convolutions of the torsionally stressed coil in the wall of said carcass. The cured carcass and reinforcement is then removed from the mandrel, at which time the finished conduit contracts axially as the convolutions of the coil tend to move toward their original condition.

Further, the torsional stress on the convolutions of the reinforcement is transferred to the wall of the conduit so as to convert the conduit wall portions between successive convolutions of the helical reinforcement into a series of circumferentially disposed, successive folds or pleats extending radially outward but terminating short of the peaks of the conduit wall defined by the convolutions of the wire reinforcement.

Figure 1:
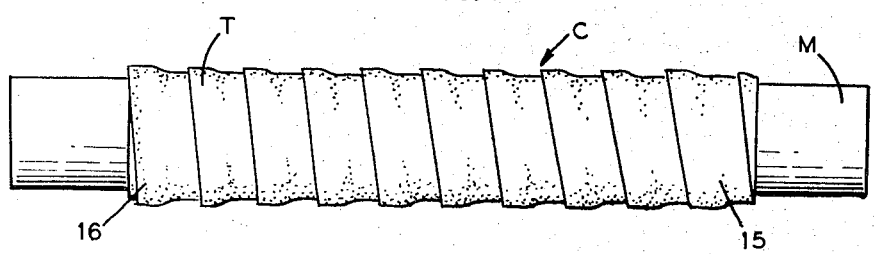
FIGS. 1, 2, 3 and 4 show the sequential steps of assembling the elements of a contractile-extensible conduit embodying the invention.

Thus, as shown in the drawings, and particularly FIG. 1, M designates a mandrel for forming thereon the conduit of the instant invention. A carcass C is formed from a tape T which is helically wound about the mandrel M, with overlapping edges, in a manner known in the art. Tape T is a fabric member of nylon or other suitable natural or synthetic fibers; which is coated with selected natural or synthetic rubber composition including the usual modifying agents including curing agents, antioxidants, and the like. The windings 10 of carcass C are of a suitable gauge based on the desired finished wall thickness of the conduit being formed.

Figure 2:
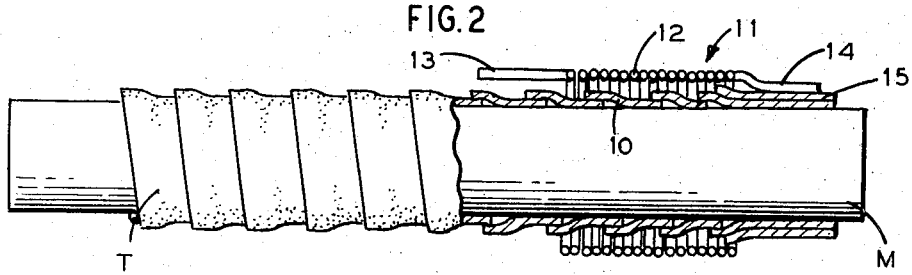

Reinforcing means is provided in the form of a coil of highly tempered high carbon steel wire 11. The successive convolutions 12 of coil 11 are normally in contacting relation, see FIG. 2. Such coil 11 is placed over the carcass portion C in coaxial relation thereto. The normal diameter of coil 11 is somewhat greater than the outer diameter of tape winding T, the coil being provided with terminal pig tails 13, 14. One pigtail 14 is suitably anchored to mandrel M over a reinforcing portion 15 of tape winding T.

Figure 3:
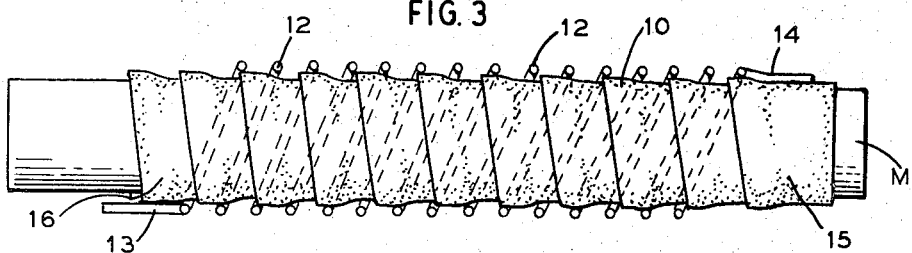
Figure 4:
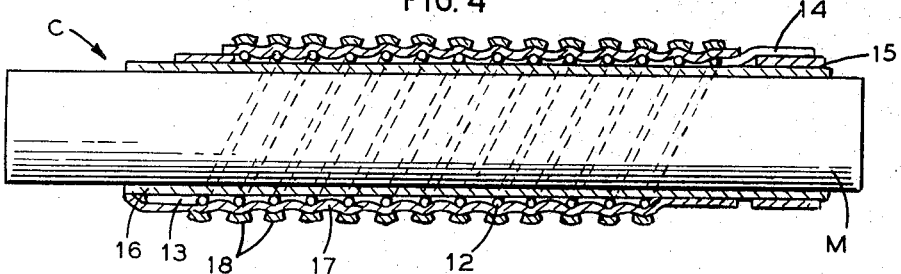
Figure 5:
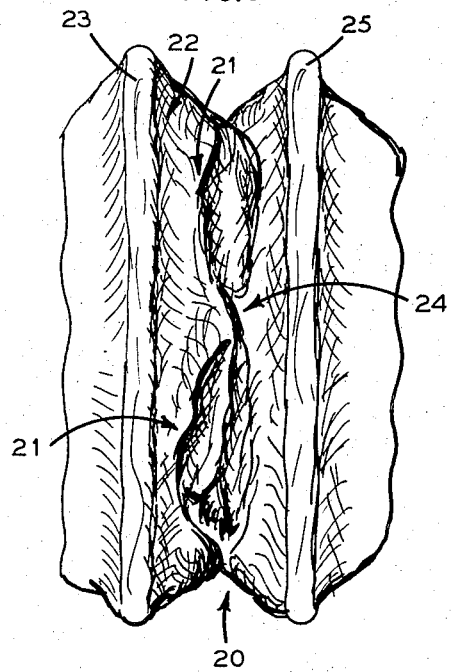
FIG. 5 is a plan view showing the conduit in its contracted state.
Figure 6:
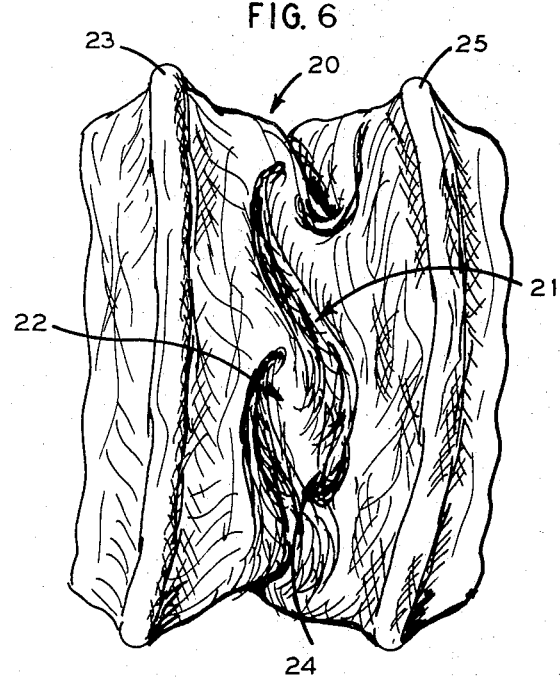
FIG. 6 is a plan view similar to that of FIG. 5, showing the conduit in its extended state.

The free end of coil 11 is then axially extended to space the individual convolutions 12 thereof at a selected pitch, as indicated in FIG. 3. Further, the free end portion of coil 11 as at pigtail 13 is twisted manually or by suitable mechanical twisting means, in a direction to progressively reduce the diameter of the coil until convolutions 12 thereof make contact with the outer surface of carcass winding T. Thus, a torsional stress is induced in the convolutions 12 of coil 11. The other pigtail end 13 is then anchored to mandrel M at the reinforcement portion 16 of tape T.

An outer carcass portion is now formed by winding over reinforcement 11, fabric tape coated with natural or synthetic rubber to form layer 17. Such tape may also be formed of nylon fabric or other suitable fabrics. Additional, narrow tapes 18 of similarly coated fabric are wound over layer 17 in overlying relation to convolutions 12 of reinforcement 11.

The resultant assembly is now placed in an autoclave to cure the elastomeric material of tape windings 10, 17 and 18 and to thus embed the convolutions 12 of reinforcement between the inner and outer carcass portions of the conduit. The coil 11 may also be preimpregnated or coated with selected synthetic resin adhesives to bond the convolutions 12 thereof to the conduit wall.

The thus finished conduit may then be removed from mandrel M, in a manner known in the art, snipping off the terminal anchored ends of pigtails 13, 14. At this time, the conduit tends to contract axially as the convolutions 12 of coil 11 tend to assume their normally contracted condition. Such action forms pleat-like portions 20 in the conduit wall between successive convolutions 12 of the coil 11.

Further, portions 20 include a plurality of folded wall portions 21 circumferentially related to each other. Each such portion 21 extends at one end from a point 22 adjacent one peak portion 23 and at the other end a point 24 adjacent peak portion 25; said peak portions 23, 25 being defined by adjacent convolutions 12 of coil 11.

Looking at the interior of the conduit, the ends of successive, circumferential folded portions 21 are in overlapping relation, when the conduit is in its normal axially contracted condition. The conduit may be readily axially extended by applying suitable forces at either one or both ends thereof. However, upon cessation of such forces, the conduit rapidly assumes its normally contractile condition. Such conduit is particularly effective when the same must be alternately extended and contracted in use with a relatively large number of such contractile-extension cycles.

By way of example, in a conduit having a fully extended length of 10', including opposite reinforcing cuff portions 15, 16 of a length of about 4 inches; the wire reinforcement has a normal inner diameter of about 4 9/16 inches and a wire diameter of 0.156 inches. The inner carcass C has an outer diameter of about 4⅛ inches. The pitch of the spaced convolutions 12 is about 3½ inches. Such a conduit has a normal contractile length of about 3 feet 6 inches.

The wire of reinforcement 11 is formed of a highly tempered high carbon steel which will retain its temper despite the elevated temperatures of the autoclave used to form the conduit. It is understood that the wire diameter of reinforcement 11; the the pitch of convolutions 12, as well as the wall thickness of tape windings 10 and 17 will be proportioned and calculated in terms of the dimensions of the conduit as a whole and the desired extensibility thereof.

It has been found that the conduit of the instant invention is highly resistant to wear, despite constant and varying conditions of usage. Further, at all times the pleatlike portions 20 will remain radially inward of peaks 23, 25 thereby avoiding excessive localized wear.

Tapes 10, 17 and 18 may be replaced by preformed tubular members of selected elastomeric material, which may be mounted on mandrel M by inflationary procedures known in the art. Also, fabric inserts may be omitted from the preformed tubular members. Further, the inner and outer carcass portions may be formed of longitudinally disposed strips of elastomeric material which are folded about mandrel M, with their longitudinal edges in overlapping relation. In all such cases, the helical coiled reinforcement is interposed between the inner and outer carcass portions, as described above.

The reinforcement 11 is made of a steel wire which is highly tempered and is of a high carbon type which shows high resiliency and a strong tendency to maintain its closely coiled condition even after repeated axial extensions thereof. Furthermore such wire must retain its temper despite elevated temperatures encountered in autoclaves used for forming the conduit.

I claim:

1. A flexible axially contractile-extensible conduit comprising a helically corrugated tubular carcass of elastomeric material, said carcass having alternating peak and valley portions, helical reinforcing means embedded in the peak portions of said carcass, said reinforcing means comprising a helical wire winding with the convolutions thereof under torsion, said valley portions including pleatlike portions extending radially inward of said peak portions, whereby said conduit is adapted to automatically contract after extension thereof and said pleatlike portions of the carcass extend radially inward of the peak portions at all times.

2. A conduit as in claim 1, wherein said pleatlike portions comprises a series of circumferentially related separate folded portions.

3. A conduit as in claim 2, wherein each folded portion extends at one end from a point adjacent one peak portion and at the other end thereof to a point adjacent a peak portion adjacent said one peak portion.

4. A conduit as in claim 3, wherein the top edge of each folded portion is disposed radially inward of the peak portions.

5. A conduit as in claim 1, wherein said wire winding is formed of highly tempered high carbon steel.

* * * * *